Jan. 30, 1951     D. SMITH     2,539,490
COMBINED VEHICLE WHEEL AND FLUID MOTOR
Filed July 25, 1947     2 Sheets-Sheet 1

INVENTOR.
DALE SMITH,
BY
McMorrow, Berman & Davidson
ATTORNEYS.

Jan. 30, 1951 D. SMITH 2,539,490
COMBINED VEHICLE WHEEL AND FLUID MOTOR
Filed July 25, 1947 2 Sheets-Sheet 2
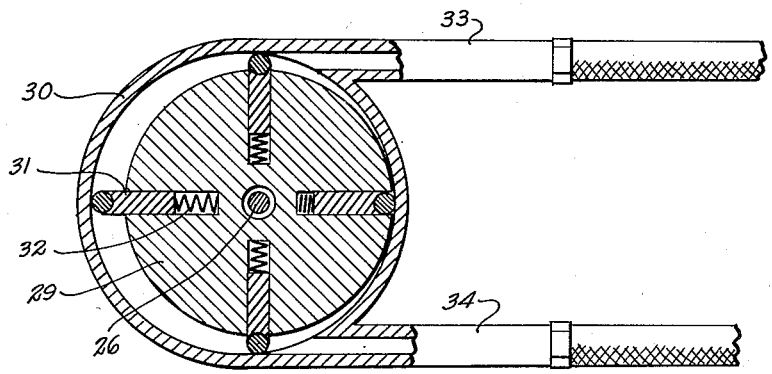
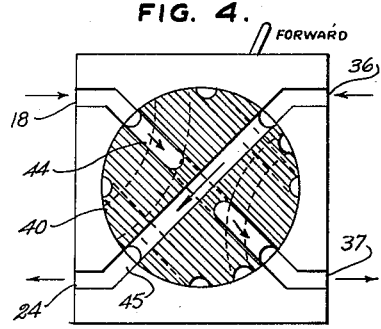
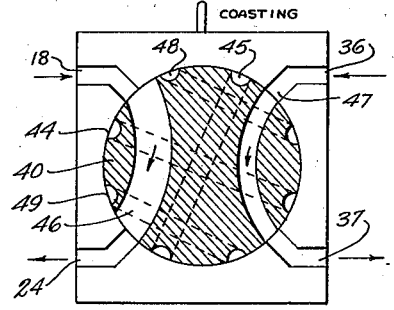
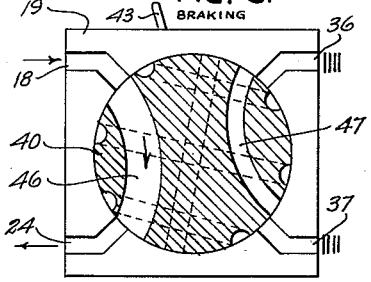
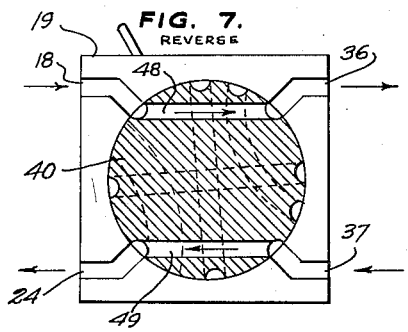
INVENTOR.
DALE SMITH,
BY
McMorrow, Berman & Davidson
ATTORNEYS.

Patented Jan. 30, 1951

2,539,490

UNITED STATES PATENT OFFICE 2,539,490

COMBINED VEHICLE WHEEL AND FLUID MOTOR

Dale Smith, Englewood, Ohio

Application July 25, 1947, Serial No. 763,506

1 Claim. (Cl. 180—66)

This invention relates to improvements in automotive vehicles and more particularly to an improved power transmission assembly for a vehicle such as motorcycle.

Conventionally motorcycles have power transmission assemblies comprising a chain and sprockets or a belt and pulleys, usually combined with a friction clutch, and some have been produced with gear drives, also combined with friction clutches. While some motorcycles have selective drive gear ratios, most have only a single forward speed and depend on belt or clutch slippage and engine throttle control to vary the forward speed. It is not customary to provide such vehicles with reverse drives, with drive neutralizing means other than the friction clutch, or with positive braking action accomplished by the power transmitting assembly. It is also not customary to provide such vehicles with hydraulic power transmitting assemblies even though a hydraulic power transmission has many advantages over the chain, belt and gear type transmissions mentioned above as in conventional use.

The present disclosure also provides hydraulically operated power transmitting mechanism, for a vehicle such as a motorcycle, which mechanism provides a forward drive, a reverse drive, free coasting and hydraulic braking of the vehicle, which is smooth and efficient in operation, maintains the hydraulic fluid therein within temperature ranges consistent with operational efficiency, and is simple in construction and easy to operate.

Other objects and advantages will become apparent from a consideration of the following description in conjunction with the accompanying drawings, wherein:

Figure 3 is a longitudinal cross-section of a suitable vehicle driving fluid motor.

Figures 1, 2:
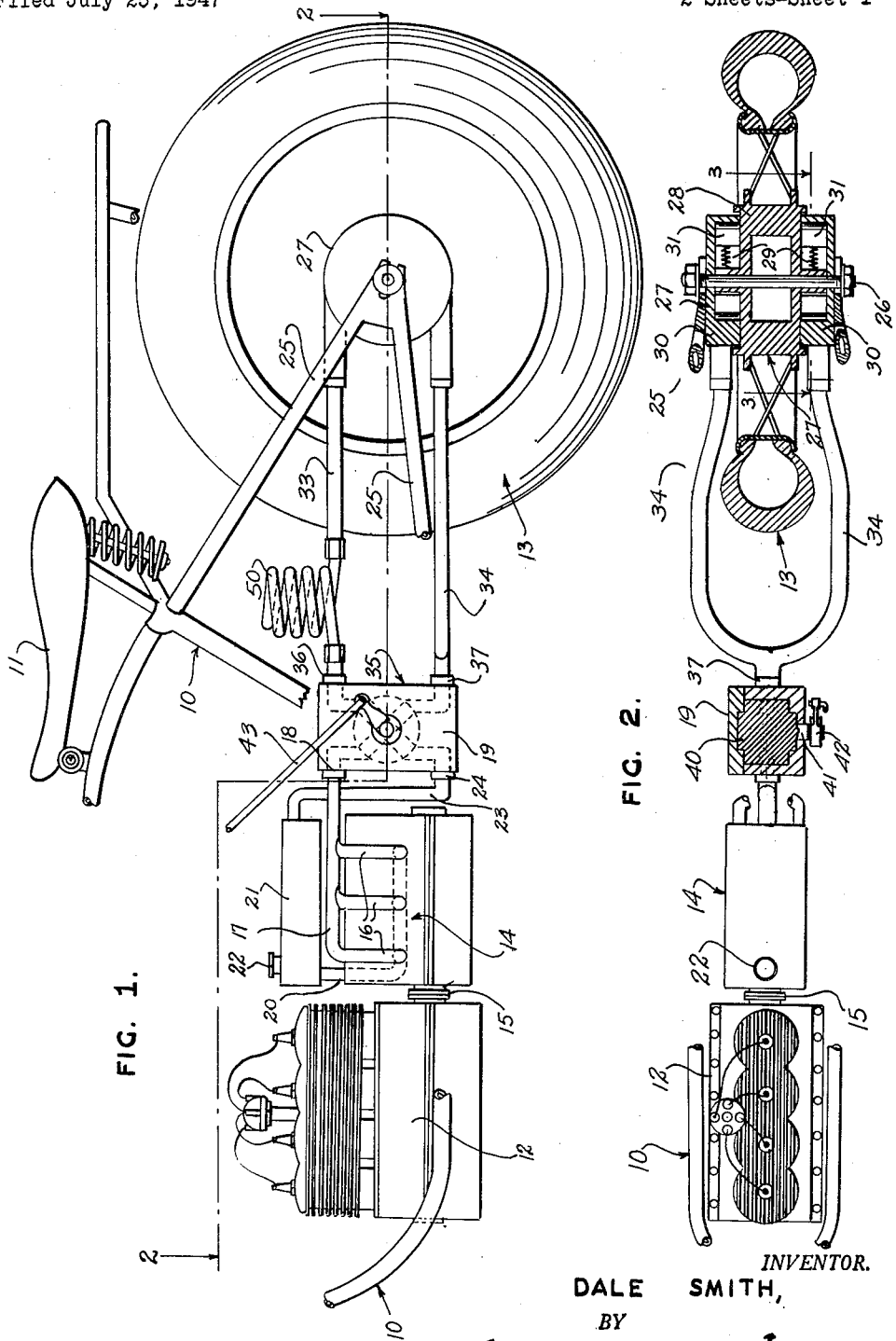
Figure 1 is a side elevation of a fragmentary portion of a conventional motorcycle showing the application thereto of hydraulic power transmitting mechanism illustrative of the invention.
Figure 2 is a transverse longitudinal cross-section on the line 2—2 of Figure 1.

Figures 4, 5, 6, and 7 are diagrammatic illustrations of a suitable fluid motor controlling valve illustrated in different operative positions.

Figure 8 is a perspective view of a rotatable valve core operative to provide the different operative positions diagrammatically shown in Figures 4 to 7 inclusive.

With continued reference to the drawings, the motorcycle has a frame, generally indicated at 10, which carries a seat 11, a conventional engine 12, and which is supported upon conventional road wheels, the rear wheel being illustrated and generally indicated at 13.

The general construction of the motorcycle may be entirely conventional and constitutes no part of the present invention except in the combination therewith of the improved hydraulic power transmitting mechanism hereinafter described.

A hydraulic fluid pump, generally indicated at 14, is mounted on the frame 10 with its drive shaft in alignment with the crank shaft of the motorcycle engine 12 and the engine's crank shaft is drivingly connected to the pump shaft by suitable means such as the flexible coupling unit 15.

The pump 14 preferably comprises a plurality of pump gear units, three such units being indicated in the pump illustrated. These units may be arranged in parallel to provide a large quantity of fluid at a relatively low pressure or may be arranged in series to provide fluid at a high pressure as may be found convenient or desirable.

In the illustrated arrangement, the pump units are shown as arranged in parallel and have their outlets connected through branches 16 with a pump outlet manifold 17 the outer end of which is connected to one port 18 of a valve body 19. The pump inlet ports are connected through a manifold 20 with the interior of a tank or reservoir 21 which is illustrated as located immediately above the pump and provided with a filler spout 22 and a fluid conduit 23 which connects the reservoir with the outlet port 24 of the valve body 19.

The rear or traction wheel 13 of the vehicle is supported in a fork 25 of the frame 10 by an axle 26 upon which the wheel hub is journaled and which is secured at its end to the ends of the side members of the fork 25.

The hub of the wheel 13 comprises a fluid motor, generally indicated at 27, having a rotatable intermediate portion which constitutes the wheel hub and is journaled upon the axle shaft 26. This portion 28 is provided at its opposite sides with rotors 29 which are rotatably received in annular recesses provided in fixed motor parts 30 which are secured to the side members of the frame fork 25 surrounding the opposite end portions of the axle 26.

The rotors 29 are mounted eccentrically of the recesses in the fixed motor members 30, as is clearly illustrated in Figure 3, and carry vanes 31 which are slidable in the rotors and cooperate with the annular walls of the recesses to provide fluid spaces of varying capacity within the rotor receiving recesses so that the rotors will be forced to rotate in the recesses of the members 30 when hydraulic fluid under pressure is forced into these spaces.

The vanes 31 are forced outwardly of the vane receiving slots in the rotors 29 by suitable compression springs 32 and are preferably provided at their outer ends with sealing members or rollers 31. A pair of fluid conduits 33 and 34 are connected to each stator unit 30 of the fluid motor. These conduits are connected to the stator unit at substantially diametrically opposed positions, as shown in Figure 3, one of them preferably being connected at the top of these units and the other at the bottom thereof. There are thus four fluid conduits altogether, two connected to each stator unit at each end of the wheel hub 27. One upper or lower pair of these conduits constitute the pressure fluid input conduits to the fluid motor and the other upper or lower pair constitute the exhaust conduits for the motor depending upon whether the motor is being operated in forward or reverse drive. The hydraulic connection between the pump inlet and outlet and the upper and lower pairs 33 and 34 of the fluid motor conduits is controlled by a valve, generally indicated at 35, hydraulically interconnected between the pump 14 and the fluid motor. The upper pair 33 of fluid conduits have a common connection with a port 36 of the valve body 19 and the lower pair 34 of fluid conduits have a common connection with the port 37 of the valve body 19.

The valve body 19 is provided internally thereof with a circular concavity which rotatably receives a cylindrical valve core 40 from one end of which a stem or shaft 41 extends through one wall of the body to receive on its outer end an arm 42 which is moved by a manually operated valve lever 43 to rotate the valve core in the valve body. The valve core 40 is provided with openings therethrough operative to provide the four operative connections illustrated in Figures 4 to 7 inclusive.

For forward drive operation of the fluid motor, the valve core is provided with two non-intersecting, diametrical apertures 44 and 45 disposed substantially at right angles to each other. When the valve core is in the forward drive position the aperture 44 connects the pump output port 18 of the valve body with the port 37 connected with the lower pair of conduits 34 and the aperture 45 connects the reservoir connected port 24 of the valve body with the port 36 connected to the pair of fluid motor conduits 33 so that the pair of conduits 34 act as pressure fluid conduits and the pair of conduits 33 serve as exhaust conduits for the fluid motor. Under these conditions, hydraulic fluid under pressure supplied to the fluid motor by the pump 14 will impart to the fluid motor a rotation in a direction to impart a forward drive to the traction wheel 13.

The valve core 40 is also provided with a pair of curved apertures 46 and 47 extending substantially chord-wise therethrough, the aperture 46 preferably being wider than the aperture 47. When the valve core is in the position shown in Figure 5 the apertures 44 and 45 are displaced from the valve body ports and rendered ineffective while the port 46 connects the port 18 with the port 24 and the aperture 47 connects the port 36 with the port 37. Under these conditions, hydraulic fluid from the pump will circulate from the pump output connection to the port 18, through the aperture 46 to the port 24, and from the port 24 back to the reservoir 21 thus providing for idle operation of the pump during which the hydraulic fluid is merely recirculated without doing any work. At the same time the connection of the port 36 to the port 37 through the valve aperture 47 permits the fluid motor to run freely thus providing a free coasting operation for the vehicle.

In the operative position shown in Figure 6, the valve core has been rotated sufficiently in the valve body to bring the aperture 47 out of alignment with the ports 36 and 37 thereby blocking the connection between these ports and preventing flow of hydraulic fluid from one side of the hydraulic motor to the other. This blocking of the fluid in the hydraulic motor creates a resistance to operation of the motor which acts to apply a braking force to the traction wheel 13 of the vehicle. At the same time, because of the greater width of the aperture 46 the ports 18 and 24 remain connected to continue idling operation of the pump 14. While the valve is shown in Figure 6 as moved to a position in which the ports 36 and 37 are completely cut off from each other, it is apparent that a variably restricted connection may be provided between the ports to provide a manually controlled braking action for the vehicle.

In the arrangement of the valve shown in Figure 7, the valve body port 18 is connected through the straight, chord-wise aperture 48 in the valve core 40 with the port 36 and the port 24 is connected through the chordwise core aperture 49 with the port 37. This position of the valve provides for reverse operation of the fluid motor by connecting the pump output port 18 with the motor conduits 33 and the reservoir connected port 24 with the motor conduit 34.

Suitable means are provided to cool the hydraulic fluid between the pump 14 and the hydraulic motor in case the fluid reservoir 21 is found insufficient for this purpose. Such cooling means may comprise a cooling coil 50 the ends of which are interconnected into one of the fluid motor conduits 33. If found desirable or necessary a similar coil may be interconnected into each of the pair of conduits 33 and may be positioned within the upper angle of the frame 34 as this provides a convenient space for the location of such fluid cooling means. Other cooling means such as a conventional oil radiator may be used, if desired and may be connected into any part of the hydraulic fluid system without in any way exceeding the scope of the invention.

There is thus provided a hydraulic power transmitting mechanism for a motorcycle or similar vehicle which is capable of four different modes of operation, that is, forward drive, free coasting with the hydraulic pump in idling operation, fluid braking with the hydraulic pump in idling operation, and reverse operation of the mechanism. There is also provided a smooth and efficient power transmitting mechanism which can be economically installed in a vehicle and is simple and easy to operate.

The invention may be embodied in other specific forms without departing from the spirit or essential characteristics thereof. The present embodiments are, therefore, to be considered in all respects as illustrative and not restrictive, the scope of the invention being indicated by the appended claim rather than by the foregoing description, and all changes which come within the meaning and range of equivalency of the claim are, therefore, intended to be embraced therein.

What is claimed is:

A combined vehicle wheel and fluid motor comprising an axle shaft, a wheel hub structure journaled on said axle shaft, two rotors carried by said hub structure and disposed one on each side of the latter, said rotors being eccentric to the axis of rotation of said hub structure and having vane receiving slots therein, vanes slidably mounted one in each of said slots, two fixed motor parts disposed one at each side of said hub structure and each provided with an aperture receiving the corresponding end of said axle shaft, each of said fixed motor parts having therein a recess receiving the adjacent rotor and associated vanes with the recess in each fixed motor part substantially coaxial with the axis of rotation of said hub structure to provide fluid receiving spaces of varying capacity within each of said fixed motor parts surrounding the corresponding rotor, and two fluid conduits connected to each fixed motor part and communicating with the corresponding recess at substantially diametrically opposite locations relative to the latter.

DALE SMITH.

REFERENCES CITED

The following references are of record in the file of this patent:

UNITED STATES PATENTS

| Number | Name | Date |
|---|---|---|
| 640,284 | Hill | Jan. 2, 1900 |
| 1,042,596 | Pearson | Oct. 29, 1912 |
| 1,099,161 | Brown | June 9, 1914 |
| 1,363,068 | Washer | Dec. 21, 1920 |
| 1,609,044 | Williams | Nov. 30, 1926 |
| 1,926,692 | Tarbox | Sept. 12, 1933 |

FOREIGN PATENTS

| Number | Country | Date |
|---|---|---|
| 19,070 | Great Britain | Sept. 24, 1901 |